No. 621,523. Patented Mar. 21, 1899.
P. J. R. DUJARDIN.
SECONDARY BATTERY.
(Application filed Dec. 29, 1897.)

(No Model.) 2 Sheets—Sheet 1.

Witnesses:
Geo. S. Hamsdy.
Frank S. Ober

Inventor
Paul J. R. Dujardin
by M. A. Rosenbaum
Atty.

THE NORRIS PETERS CO., PHOTO-LITHO., WASHINGTON, D. C.

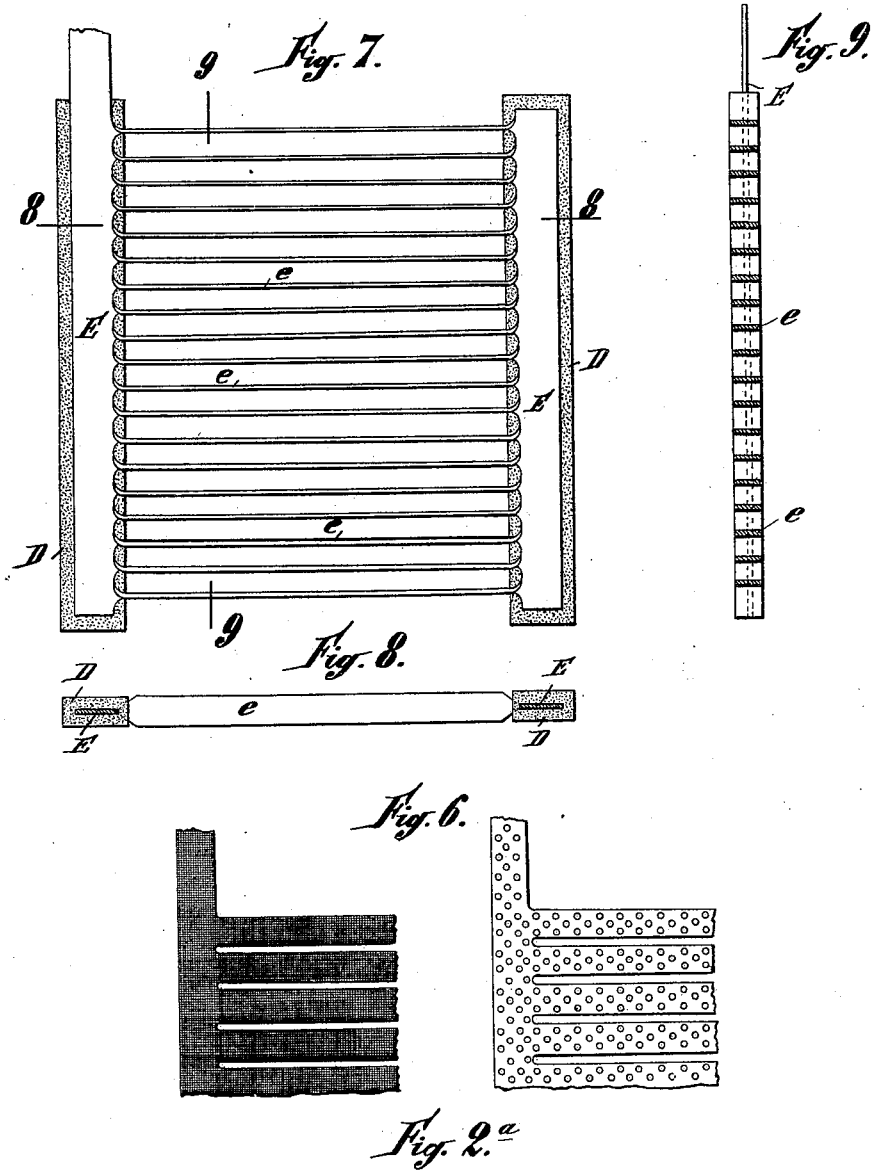

UNITED STATES PATENT OFFICE.

PAUL JOSEPH RODOLPHE DUJARDIN, OF PARIS, FRANCE.

SECONDARY BATTERY.

SPECIFICATION forming part of Letters Patent No. 621,523, dated March 21, 1899.

Application filed December 29, 1897. Serial No. 664,181. (No model.)

*To all whom it may concern:*

Be it known that I, PAUL JOSEPH RODOLPHE DUJARDIN, a citizen of the French Republic, residing at Paris, in the French Republic, have invented certain new and useful Improvements in Electrical Accumulators or Secondary Batteries, (patented in France March 29, 1897, No. 267,388,) of which the following is a specification.

The present application for Letters Patent relates to certain improvements in the construction of the plates for secondary batteries of the lead-zinc type. It is well known that in this class of secondary batteries the presence of mercury is indispensable in order to avoid the attack of the zinc when the circuit is open and in order to permit of the amalgamation of the layers of zinc during the charge. In order to prevent the escape of the mercury at the end of the discharge, I divide the plate into sections or conductors arranged horizontally, upon which the electrolytic deposition of the zinc takes place during the charge, (any passage of mercury from one section to the other being prevented,) so that there will not be any flow of this metal from the upper conductors to the lower conductors. This arrangement can be carried out in practice in various manners. I shall describe by way of example three patterns of plates constructed according to my invention; but it is evident that I may construct plates of other patterns without departing from the principle of my invention.

Figure 1:
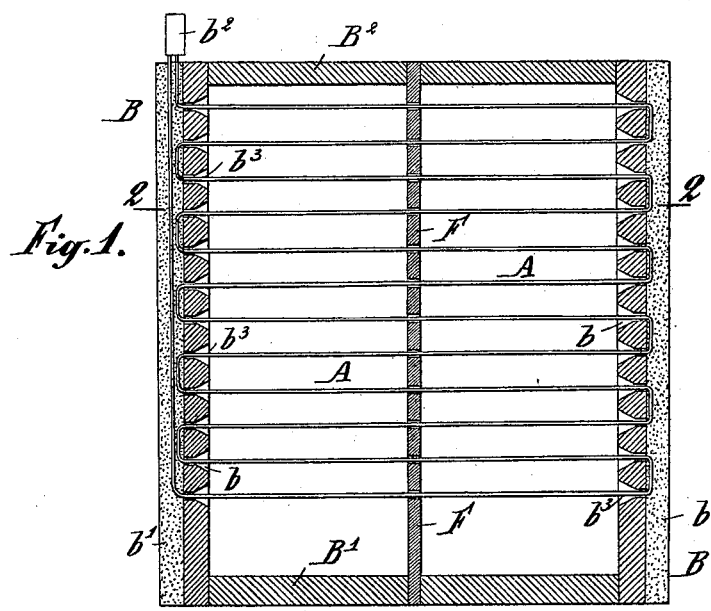
Figure 2:
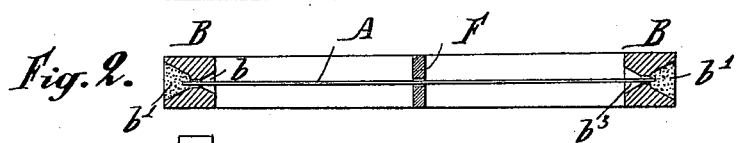
Figure 3:
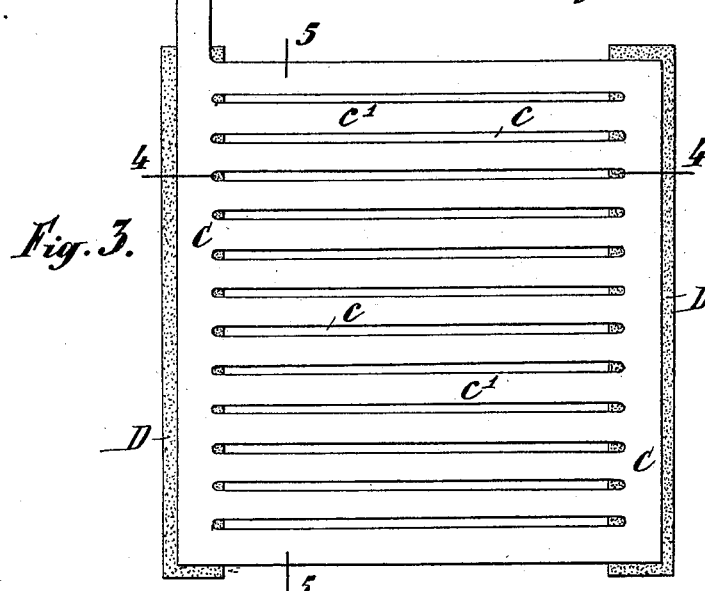
Figure 5:
Figure 4:
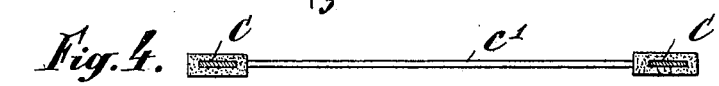

Referring to the drawings accompanying this specification, Figure 1 is a longitudinal section of a first modification. Fig. 2 is a section on the line 2 2 2 2 of Fig. 1. Fig. 2ª is an enlarged detail. Fig. 3 is a longitudinal section of a second pattern of plate. Fig. 4 is a section on the line 4 4 of Fig. 3. Fig. 5 is a section on the line 5 5 of Fig. 3. Fig. 6 is a part view in elevation of two kinds of plates having latticed and perforated surfaces. Fig. 7 is a longitudinal section of a third modification. Fig. 8 is a section on the line 8 8 of Fig. 7. Fig. 9 is a section on the line 9 9 of Fig. 7.

In order that my invention may be thoroughly understood, I will first discuss certain theoretical considerations.

As may be proved by experiment, if a wire of zinc be amalgamated by immersion in a bath of mercury this wire will retain, by adhesion to its surface, a measurable quantity of mercury in the metallic state, which remains adherent to the surface of the wire as long as this remains horizontal; but if the wire is flattened or is of a sufficient diameter drops of mercury will accumulate at the lower part and will form in the course of a short time a larger drop, the weight of which is sufficient to detach it from the wire. The quantity of mercury which remains adherent to the metal varies considerably, according to the molecular aggregation of the zinc. For instance, a drawn wire of zinc will retain only about a tenth of its weight of mercury either amalgamated or retained by adhesion. A metallic wire or a ring of carbon coated with zinc by the electrolysis of a neutral bath of sulfate of zinc will retain nearly one-third of its weight. If, on the other hand, the deposit of zinc has been obtained in an acidulated bath, the mercury absorbed or retained in the pores and cavities of the rough metal deposited exceeds very much the weight of the zinc. Under these conditions the porous zinc serves as a kind of sponge or capillary reservoir for the mercury, with which it is saturated.

Figs. 1 and 2 represent one of the modifications which I may give to my plates. The plate is constructed with a series of conductors A of small diameter and of any desired shape, but usually in the form of fine wires twisted into cables, as shown in Fig. 2ª, the interstices of the said wires retaining by capillary attraction a quantity of mercury, sufficient to thoroughly amalgamate the zinc deposited susceptible of being amalgamated, supported between two pieces B B, which are not susceptible of amalgamation. The conductors A A A may be of any construction, such as of zinc or of a metal of any kind covered with zinc or of any other substance—such as carbon, for instance, coated with zinc either directly or with interposition of another metal. These latter methods of forming the conductors admit of the use of a very small quantity of zinc without diminishing the rigidity of the conductor. The pieces B B are perforated with holes $b\ b$ for the passage of the conductors A. These conductors are in electrical contact in a groove $b'$, which is filled with mastic. The electrical contact can be rendered certain either by reason of the continuity of the conductor, as shown in the drawings, or by means of special conductors uniting the ends of the separate horizontal conductors. In all cases the combination of the metallically-united conductors leads to a conductor $b^2$, forming the pole of the plate. If the said conductors are wires or cables of wires or metallic strips capable of being strongly amalgamated, they are covered at their ends $b^3$ $b^3$ with a layer of metal not susceptible of amalgamation or with a suitable enamel for the purpose of preventing the passage of mercury by absorption from an upper conductor to a lower conductor. The apertures $b$, made in the supports B, are generally widened toward the outside, so that if by accident the conductors A A A happen to be placed at the end of the discharge in a vertical position the drops of mercury leaving the zinc will be collected in these cavities, from which they will reissue and again spread themselves over the porous zinc when the conductors are returned to the horizontal position. One may also with advantage connect the supports together, forming a rectangle by means of the pieces B′ B′, so as to form a rigid frame which supports all the conductors. Finally, it is preferable to roughen the surface of the conductors or to cover them with wire-gauze in order to increase the adhesion of the mercury and of the deposited metal.

A second arrangement of the electrode is represented in Figs. 3, 4, and 5. The electrode is constructed of a single plate C, in which are formed a number of parallel channels $c$, dividing the plate into ribs $c'$. These ribs, at their ends, are covered with a layer D of mastic or of adhesive enamel which resists acid and which prevents the mercury from spreading by absorption from an upper blade to a lower blade. These blades may be either latticed or perforated, as shown in Fig. 6, or they may be pitted on their faces, the holes thus formed not passing completely through them.

Figs. 7, 8, and 9 represent a third arrangement of the plate E, constructed in a similar manner to that of the preceding modification, but in which the conductors or blades $e$ are caused by twisting or by any other suitable means to be placed horizontally in the direction of their widest face. This arrangement is found to be the one which retains the greatest amount of mercury and adapts itself to the most rapid charging. As in the previous pattern of plate, the blades are latticed, perforated, or cellular; also, the said blades are covered at their ends with a layer of enamel or mastic, preventing the escape of the mercury from one blade to the other. When the plates are of a sufficiently large size, I attach upon the conductors one or more supports, such as F, Figs. 1 and 2, formed of a substance not susceptible of amalgamation and which serves at the same time to maintain a suitable separation between the negative and positive plates, for which purpose the dimensions of these supports are of course properly proportioned.

Having explained in detail my system of negative electrodes for accumulators of the "lead-zinc" kind and described in the foregoing paragraphs three principal modifications for carrying the same into effect, I will give some indications respecting variations of my system of plates.

I usually employ a layer of zinc thicker than that which would be absolutely necessary for the complete discharge of the plates, regulating the quantity of mercury absorbed to that which is really necessary to prevent the said layer being attacked when the circuit is open. Under these conditions when the normal discharge is finished the mercury remains inclosed in the pores of the porous zinc and has no tendency to remove from it if the conductor remains practically horizontal. When the plate is charged, the mercury amalgamates with the zinc in proportion to its deposition upon the conductors. In the case of a heavy surcharge the zinc deposited, being no longer combined in sufficient proportion with the mercury, is redissolved in the acid-bath and there remains only upon the plate the original quantity of zinc—that is to say, about double the quantity which would be necessary for the capacity of the accumulator. I would further point out that in these arrangements there is during normal working no tendency of the mercury to descend or to rise up along the conductors.

The preceding arrangements and descriptions apply also in the case of the use of cadmium in place of zinc, and I reserve the right of utilizing this metal, although the high price thereof has hitherto prevented its industrial application for this purpose.

It should also be clearly understood that I do not limit my invention expressly to the three modifications of plates which I have described and that the said modifications may be varied without departing in any way from the principle of my invention. Thus, for instance, a plate might be constructed with strips the largest faces of which should be alternately vertical and horizontal, thus combining my section and my three arrangements. Also in one and the same plate there might be perforated portions and supports perforated or pitted, &c. All such forms come within the scope of my claims.

What I claim is—

1. In a plate for accumulators of the lead-zinc type, in combination with suitable supports, conductors of small thickness arranged horizontally between said supports and provided with capillary openings adapted to retain mercury, means for maintaining a proper distance between said conductors and means for preventing the escape of the mercury from the conductors, substantially as described.

2. In a plate for accumulators of the lead-zinc type, in combination with suitable supports, conductors of small thickness arranged horizontally between said supports, said conductors having capillary openings adapted to retain mercury, and means for preventing the escape of the mercury from the conductors, substantially as described.

3. In a plate for accumulators of the lead-zinc type, in combination with suitable supports, conductors of small thickness arranged horizontally between said supports said conductors being in the shape of twisted wires in order to retain mercury by capillarity, a layer of enamel protecting the ends of said conductors and preventing the escape of the mercury from the conductors, cavities in the supports for retaining, in case of need, the drops of mercury which may descend along the conductors and means for preventing the supports from amalgamating.

In testimony whereof I have signed this specification in the presence of two subscribing witnesses.

PAUL JOSEPH RODOLPHE DUJARDIN.

Witnesses:
EDWARD P. MACLEAN,
JOHN S. ABERCROMBIE.